Patented Sept. 12, 1950

2,522,053

UNITED STATES PATENT OFFICE 2,522,053

CHLORINATED METHYL SILOXANES

Rob Roy McGregor, Verona, and Earl Leathen Warrick, Pittsburgh, Pa., assignors to Corning Glass Works, Corning, N. Y., a corporation of New York No Drawing. Original application February 13, 1946, Serial No. 647,395. Divided and this application March 22, 1950, Serial No. 151,310

6 Claims. (Cl. 260—448.2)

This invention relates to new compositions of matter and methods of preparing them.

This application is a division of the applicants' copending application Serial No. 647,395, filed February 13, 1946 which was copending with and is a continuation-in-part of their U. S. Patent No. 2,435,148, filed May 25, 1945 and issued January 27, 1948. Patent 2,435,148 was copending with and was a continuation-in-part of their Patent No. 2,384,384, filed February 26, 1942 and issued September 9, 1945. The above application and patents were all assigned to the assignee of the present invention.

The primary object of the present invention is to prepare chlorinated methyl siloxane polymers. Other objects and advantages will be apparent from the following description and claims.

In accordance with our invention, we have discovered that methyl siloxanes may be chlorinated to yield products which are useful either as intermediates in the preparation of other materials or which are useful in their own right as coating compositions (as will be later described). The chlorination is preferably carried out by passing chlorine through the methyl siloxane at a temperature within the range of about 30° C. to 200° C. and preferably in the presence of sunlight. If the siloxane is a liquid, the chlorine may be passed directly through the liquid or through a solution thereof in an inert solvent; if the siloxane is a solid, then it should be dissolved in an inert solvent or heated above its melting point. As a result of such treatment the viscosity of the siloxane increases and if continued for a sufficient time a waxy solid is produced. As high as 65% by weight of chlorine can be introduced in this manner. If the chlorination is stopped at some intermediate point, a viscous liquid is obtained which, upon being heated, increases rapidly in viscosity until ultimately a gel is produced rather than a waxy solid. The melting point of the waxy solid produced by extended chlorination depends upon the amount of chlorine introduced, the larger the amount the higher the melting point. To obtain the highly chlorinated products, it is advisable to employ an inert solvent such as carbon tetrachloride. We have found that it is immaterial whether the starting siloxane is completely dehydrated such as the cyclic trimer, tetramer or pentamer of dimethyl silicone, hexamethyldisiloxane or whether it is a chain polymer whose terminal groups are hydroxyl, chlorine, or trimethyl silicon units, or combinations thereof.

The chlorinated products of our invention whether in a low or high degree of chlorination are useful as intermediates in the preparation of other compositions. For example, the chlorinated cyclics having from one to two chlorine atoms per cyclic unit are useful in the preparation of thermally stable liquids of low pour points as is described in the above mentioned applications. However, we have found the polychlorinated products to be particularly useful in their own right as coating materials for glass threads. The latter are composed of a large number of fine attenuated glass fibers, some of which break during sewing operations causing fuzzing of the thread and seriously hindering the rapid and effective fabrication of textile fabrics and the like. When the thread is coated with a polychlorinated methyl siloxane and baked to a tack-free state, not only is the fuzzing problem completely solved, but also the tensile strength of the thread is considerably increased. The products of the present invention are also useful as additives to lubricants such as petroleum oils to improve their resistance to extreme pressure. The pure compounds are useful as dielectric fluids and are particularly effective as solvents for organic compositions in general.

For a better understanding of our invention reference should be had to the following examples which are given by way of illustration and not limitation.

Example 1

The cyclic pentamer of dimethyl silicone was chlorinated by passing chlorine gas through it at room temperature in the sunlight until analysis showed that it contained about .1 chlorine atom per carbon atom or one chlorine atom per cyclic unit. When the chlorinated product was distilled only about 20% of it boiled in the neighborhood of the boiling point of the pentamer. The remaining 80% was not only higher boiling but was also much more viscous. Continued heating of the latter portion resulted in gelation.

Example 2

The cyclic pentamer of dimethyl silicone was chlorinated by passing chlorine gas through it at room temperature and in the sunlight until analysis showed that it contained about 1.09 chlorine atoms per carbon atom or about 10 chlorine atoms per cyclic unit. The product was a clear waxy solid with a melting point of about 150° C. When heated in an open beaker without a catalyst for about 15 hours at about 125° C. HCl was evolved and the material lost its waxy characteristics and became a resinous solid. When treated with aluminum chloride and heated at 175° C. it became a tacky resinous solid in four hours. The effect of chlorine content on melting point was demonstrated in the following manner. When 0.8 atoms per carbon atom were introduced into the cyclic pentamer the product had a melting point of 98° C. When the chlorine content was 1.04 chlorines per carbon atom, the melting point was 165° C. and when it was 1.20, the melting point was 185° C.

*Example 3*

As in Example 2, the cyclic tetramer of dimethyl silicone was chlorinated at room temperature until analysis showed it to contain about .37 chlorine atoms per carbon atom or about 3 chlorine atoms per cyclic unit. When the chlorinated material was heated to 250° C., it formed a semi-solid mass. From this product an oily liquid was extracted with benzene which, on heating overnight at 230° C. became solid.

*Example 4*

A mixture of chain polymers of dimethyl silicone was chlorinated until its chlorine content was about 6% by weight and its viscosity about 75,000 centistokes. The product was heated at 230° C. with 3.7% by weight of boric oxide until a rubbery solid was obtained. The latter possessed considerable elasticity without the property of "cold flow" which is common to most dimethyl silicone polymers treated in like manner with boric oxide.

*Example 5*

Liquid dimethyl silcone prepared by the hydrolysis of dimethyldiethoxy silane in the presence of sulfuric acid and having a viscosity of 500 centistokes was chlorinated by passing chlorine gas through it at room temperature in sunlight until analysis showed it to have 5.7% by weight of chlorine. The chlorinated product was heated at 145° C. Its viscosity slowly increased until finally it became a homogeneous gel which was soluble in benzene. Glass fiber tapes were impregnated with the benzene solution of the gel and the solvent volatilized. The impregnated tape was then heated at 250° C. until the coating became tack-free and hard. Further heating at the same temperature for many hours left the tape essentially unchanged.

*Example 6*

Liquid dimethyl silicone having a viscosity of 500 centistokes was chlorinated in the manner of Example 5 to 9.4% chlorine content. The product was dissolved in CCl$_4$ to make a 5% solution. Glass thread was dipped into the solution and then baked to dryness. It was found that the strength of the thread had increased; its grist and stiffness had changed only slightly. On being subjected to sewing operations there were no breaks or fuzzing whereas the untreated thread when subjected to the same test broke twice and was very fuzzy throughout the entire operation.

That which is claimed is:

1. A cyclic chlorinated dimethylsiloxane having from 1 to 10 chlorine atoms per cyclic unit.
2. A cyclic chlorinated dimethylsiloxane having from 3 to 5 silicon atoms per siloxane molecule, and from 1 to 10 chlorine atoms per cyclic unit.
3. A cyclic dimethylsiloxane having from 3 to 5 silicon atoms per molecule, and from 1 to 3 chlorine atoms per cyclic unit.
4. A cyclic chlorinated dimethylsiloxane having 1 chlorine atom per cyclic unit.
5. A cyclic chlorinated dimethylsiloxane having from 3 to 5 silicon atoms per siloxane molecule, and 1 chlorine atom per cyclic unit.
6. A chlorinated cyclic pentamer of dimethylsiloxane having 1 chlorine atom per cyclic unit.

ROB ROY McGREGOR.
EARL LEATHEN WARRICK.

REFERENCES CITED

The following references are of record in the file of this patent:

UNITED STATES PATENTS

| Number | Name | Date |
|---|---|---|
| 2,384,384 | McGregor | Sept. 4, 1945 |
| 2,435,148 | McGregor | Jan. 27, 1948 |
| 2,439,669 | Nordlander | Apr. 13, 1948 |

OTHER REFERENCES

Krieble et al., "Jour. Am. Chem. Soc.," vol. 68 (1946).